US008919725B2

(12) United States Patent
Sayre et al.

(10) Patent No.: US 8,919,725 B2
(45) Date of Patent: Dec. 30, 2014

(54) EXTERIOR MOUNTING APPARATUS FOR INTERIOR COMPONENT

(75) Inventors: Jeffrey Paul Sayre, Naperville, IL (US); Christopher Paul Bartsch, Aurora, IL (US)

(73) Assignee: Caterpillar Inc., Peoria, IL (US)

( * ) Notice: Subject to any disclaimer, the term of this patent is extended or adjusted under 35 U.S.C. 154(b) by 148 days.

(21) Appl. No.: 13/478,598

(22) Filed: May 23, 2012

(65) Prior Publication Data
US 2013/0313398 A1 Nov. 28, 2013

(51) Int. Cl.
*F16M 13/00* (2006.01)
(52) U.S. Cl.
USPC .......................................... 248/638; 248/560
(58) Field of Classification Search
USPC ................................. 248/560, 634, 637, 638
See application file for complete search history.

(56) References Cited

U.S. PATENT DOCUMENTS

| | | | |
|---|---|---|---|
| 5,335,893 A * | 8/1994 | Opp | 248/635 |
| 6,270,051 B1 | 8/2001 | Power | |
| 6,296,236 B1 | 10/2001 | Ott | |
| 6,712,655 B1 | 3/2004 | Schlemmer et al. | |
| 7,261,365 B2 * | 8/2007 | Dickson et al. | 296/190.07 |
| 7,416,174 B2 * | 8/2008 | Dickson et al. | 267/141.1 |
| 7,416,244 B2 * | 8/2008 | Polk et al. | 296/190.07 |
| 7,503,415 B2 | 3/2009 | Hasegawa et al. | |
| 7,510,163 B2 | 3/2009 | Schlitzkus et al. | |
| 7,918,438 B2 * | 4/2011 | Sato et al. | 267/140.13 |
| 8,491,041 B2 * | 7/2013 | Fukunaga et al. | 296/190.08 |
| 2012/0223211 A1 * | 9/2012 | Mayr et al. | 248/634 |

FOREIGN PATENT DOCUMENTS

DE 298 04 432 3/1998

\* cited by examiner

*Primary Examiner* — Steven Marsh
(74) *Attorney, Agent, or Firm* — Miller, Matthias & Hull

(57) ABSTRACT

A load isolation mounting apparatus may be secured to one side of a machine frame wall to support a machine component in a position closely adjacent the opposite side of the wall. The mounting apparatus may include a mounting plate having a generally planar body to which the machine component may be secured. An aperture in the machine frame wall may accommodate a support flange that may be affixed to the mounting plate and extend through the aperture for securement of the mounting plate to the isolation mount apparatus affixed to the other side of the wall. As such, the isolation mounting apparatus may be affixed to an exterior machine frame wall for protecting an interiorly positioned mounting plate, and particularly a machine component secured thereto, from potentially harmful forces, including vibrations.

19 Claims, 4 Drawing Sheets

EXTERIOR MOUNTING APPARATUS FOR INTERIOR COMPONENT

TECHNICAL FIELD

The present disclosure addresses a mounting apparatus adapted to be fixed to an exterior side of a structural wall to secure a machine component within an interior space defined by the same wall, and more particularly to an isolation mounting apparatus affixed to the exterior wall, and adapted to protect an interiorly positioned component from potentially harmful transient forces, including vibrations.

BACKGROUND

As machines, including front wheel loaders, excavators, road graders, milling machines, and the like, have become more sophisticated, the internal components required to build such machines have become more numerous. Thus, physical space within the interior machine structures has become more "crowded" with parts. As a result, utilization of available interior space within the machines has required considerable design effort to achieve optimization.

While pressures to increase machine sizes and/or footprints have often been effectively resisted, such pressures have typically been commensurately countered by pressures to reduce component sizes. Among various choices considered, component size reduction is not always feasible. In addition, issues associated with mounting and securement of components within the machines, particularly in view of increasingly tighter spaces, has given rise to smart designs of brackets, straps, and other mounting and/or placement devices.

Accordingly, it would be beneficial to provide an apparatus for supporting a component within the interior of a machine without necessity of undue compromise on size of the component, and at the same time to isolate the component from harmful transient linear and torsional forces, including vibrations.

SUMMARY OF THE DISCLOSURE

In one disclosed embodiment, a mounting apparatus secured to one side of a machine frame wall may be adapted to secure a machine component closely adjacent the opposite side of the machine frame wall. The mounting apparatus may include a mounting plate having a generally planar body to which the machine component may be secured. An aperture in the machine frame wall may accommodate a support flange affixed to the mounting plate for securement thereof to an isolation mount affixed to the other side of the wall.

In accordance with one aspect of the disclosure, the mounting plate and any component secured thereto may be positioned on a side of the frame wall that is interior to the machine, and the isolation mount may be affixed to an exterior portion of the frame wall.

In accordance with another aspect of the disclosure, the machine component may be a hydraulic spool valve assembly, and the mounting plate may be oriented vertically within the machine interior.

In accordance with a further aspect of the disclosure, the mounting apparatus may comprise three support flanges extending from the planar wall of the mounting plate, and the frame wall may include three apertures, and three isolation mounts affixed oppositely of the mounting plate, wherein each of the flanges may extend through an aperture for resilient securement to one of the isolation mounts.

In accordance with a further aspect of the disclosure, the mounting apparatus may comprise a pair of upper isolation mounts and a single lower isolation mount, all secured to the machine frame wall to define a symmetrical triangular arrangement on the exterior frame wall.

In accordance with a still further aspect of the disclosure, an apparatus for protectively mounting a machine component adjacent an interior machine wall subject to vibration may include an isolation mount having hard and soft mount supports positioned on an exterior machine wall having an aperture. The apparatus may further include a mounting plate positioned closely adjacent the interior machine wall, and the mounting plate may include a support flange extending through the aperture and adapted for interconnection of the mounting plate with the isolation mount.

DETAILED DESCRIPTION

Figure 1:
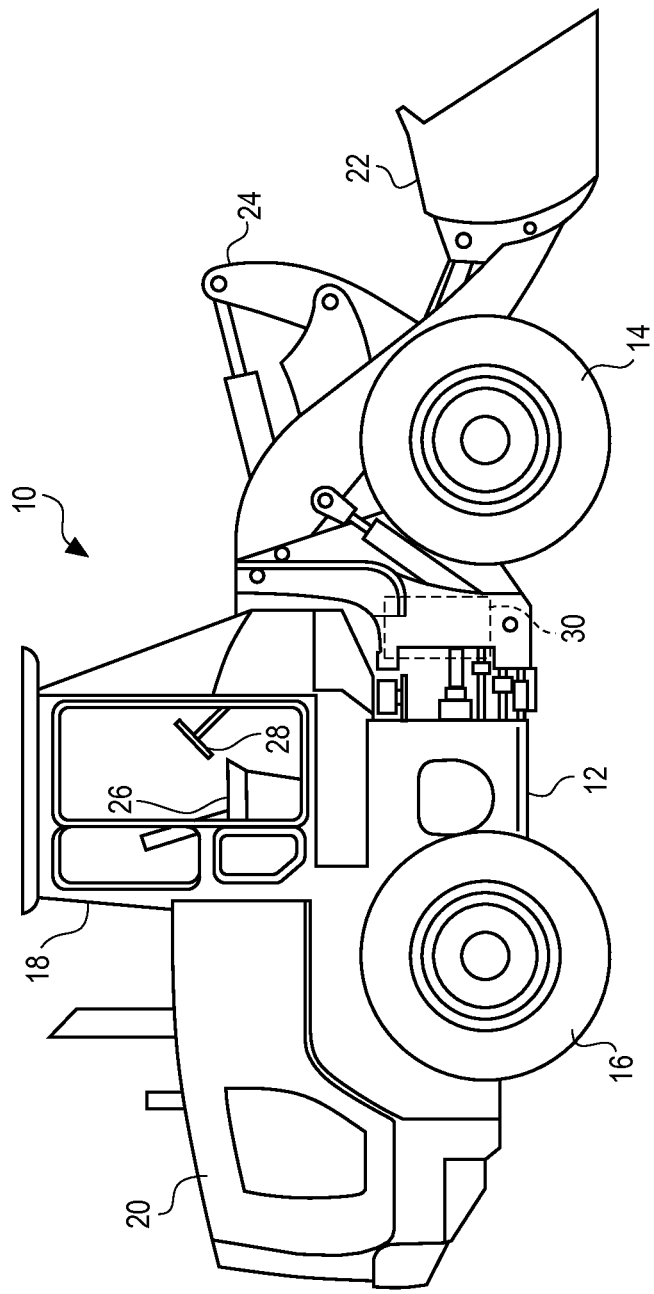
FIG. 1 depicts a side elevation view of a work machine that may incorporate one disclosed embodiment of an isolation mounting apparatus.

Referring initially to FIG. 1, a machine 10, such as a wheel loader, is depicted. The machine 10 may include a machine frame plate or wall 12, front wheels 14, and rear wheels 16. By way of example only, the machine 10 may also include a centrally positioned operator cab 18, and an engine compartment 20 positioned at a rear end of the machine 10, and/or immediately behind the cab 18. The engine compartment 20 may contain an engine (not shown) for propelling the machine 10, as well as for manipulating a functional bucket or other tool 22, shown at a front end of the machine 10.

The bucket 22 may be affixed to and directly operable by hydraulic linkage apparatus 24 that may be controlled by a machine operator (not shown) seated within the cab 18. Thus a seat 26, as well as controls 28 including a steering wheel as shown, may be utilized by such machine operator. The machine 10 may be adapted to perform work tasks, such as the movement of dirt and debris, for example.

Finally, a machine component, such as a spool valve assembly 30 (shown in phantom), may by way of example be adapted for manipulation of the bucket 22 via the hydraulic linkage apparatus 24. Such work task movements of the machine 10 may be associated with significant transient operating force loads, particularly during actual digging into soil and/or the raising and lowering buckets of dirt. As such, transmittal of forces from the machine frame wall 12 to the spool valve assembly 30 may operate to bind up the spool valve assembly 30. As such, the spool valve assembly 30 may become at least intermittently inoperative if not isolated from such transient force loads otherwise imposed thereon during operation of the machine 10.

Figure 2:
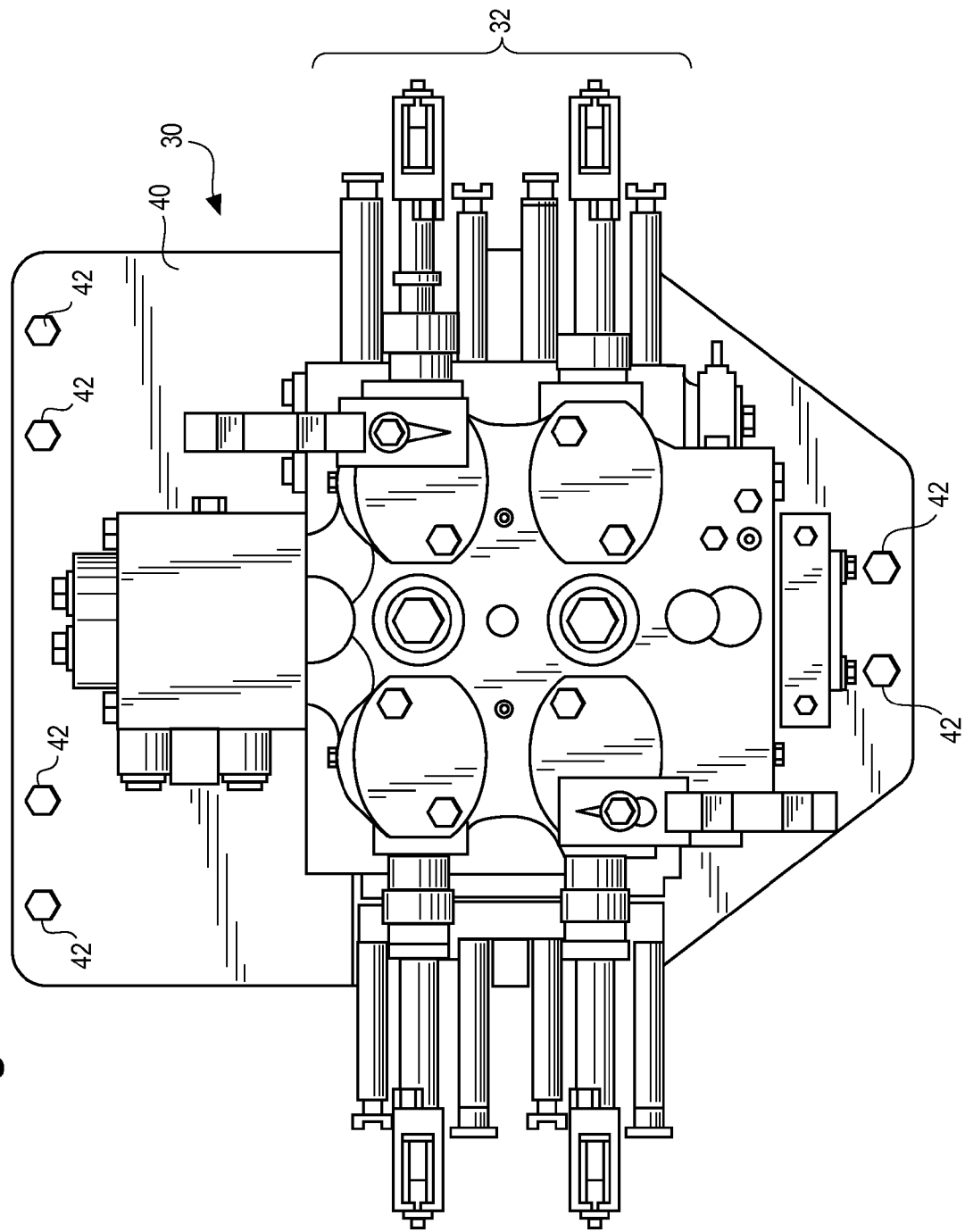
FIG. 2 depicts a frontal elevation view of an exemplary mounting plate of the disclosed embodiment including a machine component secured thereto.
Figure 3:
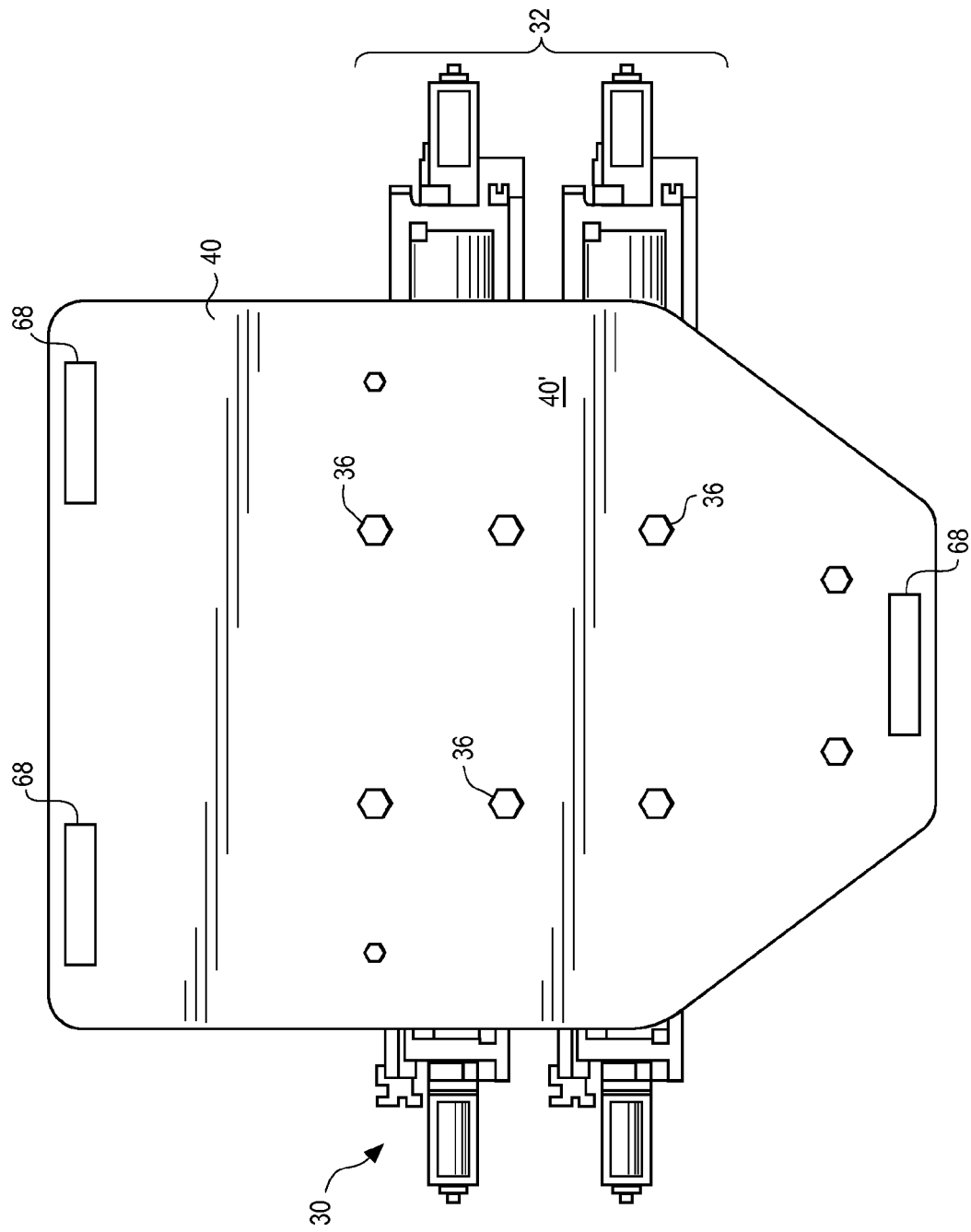
FIG. 3 is a rear elevation view of the structure depicted in FIG. 2.

Referring now to FIG. 2, a machine component, such as the spool valve assembly 30, may be secured to a mounting plate 40. The spool valve assembly 30 may incorporate a plurality of spool valves 32 adapted to move reciprocally, as may be appreciated by those skilled in the art. Referring now also to FIG. 3, the spool valve assembly 30 may be secured by a plurality of bolts 36 to the rear side 40' of the mounting plate 40.

The generally planar mounting plate 40 may be formed of any sufficiently strong and durable elastic material, including metal. However, although only metal materials may be referenced and described herein, it is envisioned that the mounting plate 40 may also be formed of any plastic composite material of sufficient strength, durability and yield, by way of example only. Moreover, even though referenced herein as generally planar, the mounting plate 40 may also be described as substantially planar to allow for adaptation to particular machine configurations, for example. In addition, to the extent that the mounting plate 40 is shown to be oriented only vertically within the context of this disclosure, so as to be substantially parallel to the machine frame wall 12, those skilled in the art will appreciate that other orientations of the mounting plate and/or its associated frame wall may fall within the scope and spirit of this disclosure.

Figure 4:
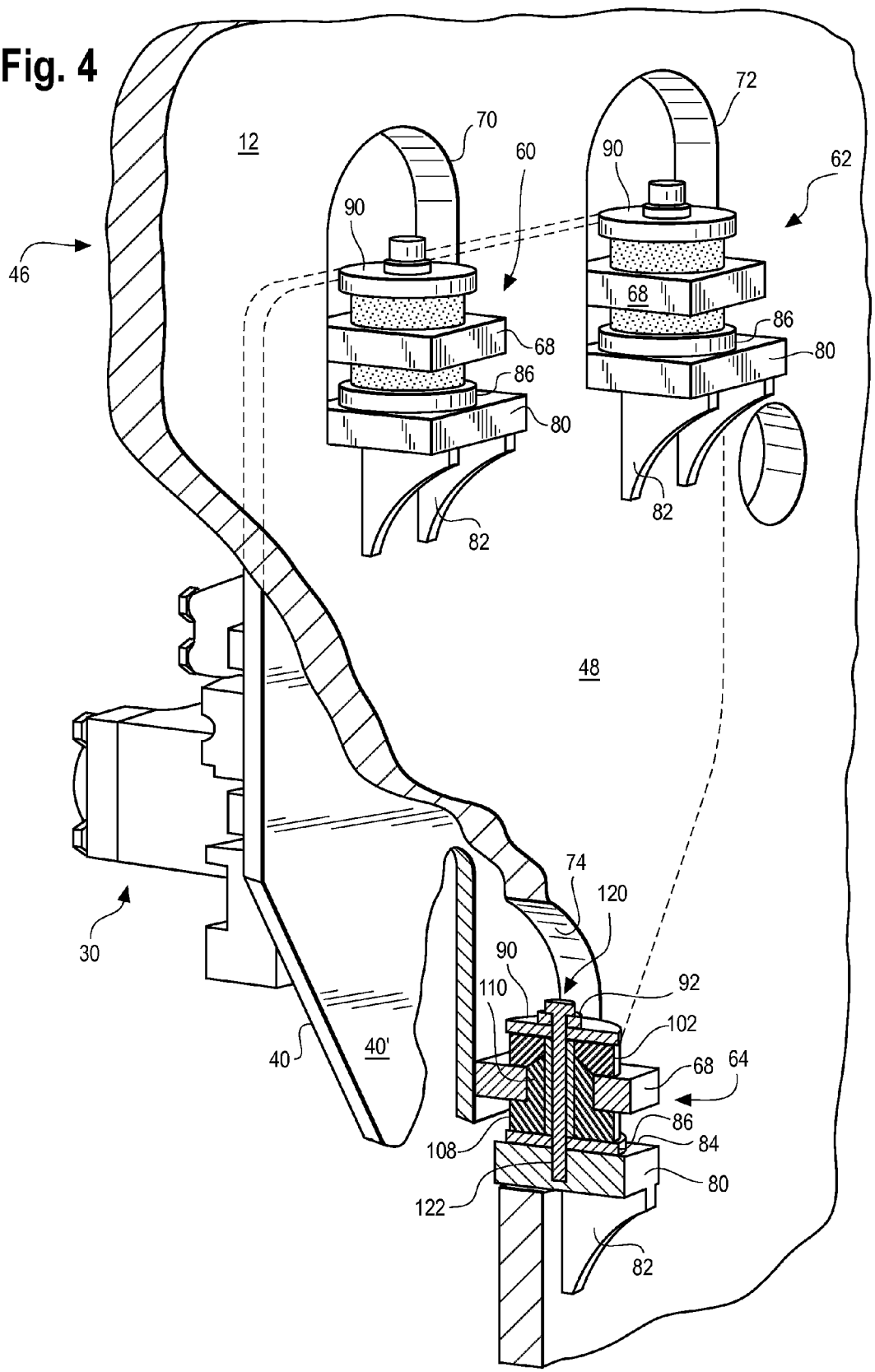
FIG. 4 is a rear perspective cutaway view of the isolation mounting apparatus of the disclosed embodiment.

Referring now particularly to FIG. 4, the rear side 40' of the mounting plate 40 may be closely secured by isolation mounts 60, 62, and 64 to the machine or interior side 46 of the machine frame wall 12. In the embodiment described, the component 30, along with the mounting plate 40 to which the component is secured, are situated within an interior space defined by the frame wall 12. Conversely, the exterior side 48 of the machine frame wall 12 defines an exterior space that is physically outside of the machine 10. In FIG. 4, upper isolation mounts 60, 62, and a single lower isolation mount 64 are situated within the exterior space, and the isolation mounts may be rigidly secured to the exterior machine frame wall 12, as for example via welded connection. Also in the example depicted, the combination of upper and lower isolation mounts 60, 62, 64 are symmetrically arranged so as to define an inverted triangular configuration on the exterior side 48 of the frame wall 12. Although other arrangements of the isolation mounts 60, 62, 64 may be feasible, the use of only three such mounts may provide a three point attachment apparatus, rather than four or more, for example, to better assure that the physical connections securing the mounting plate 40 ideally all lie within a single plane.

Continuing reference to FIG. 4, a mounting plate support flange 68 may be associated with each of the three isolation mounts 60, 62, 64. Each mounting plate support flange 68 may be rigidly secured to the rear side 40' of the mounting plate 40 by way of bolts 42 (FIG. 2). Alternatively, the support flanges 68 may be welded to the rear side 40' of the mounting plate 40.

Each of the support flanges 68 may extend through apertures 70, 72, and 74 within the frame wall 12 to permit connection to the respectively positioned isolation mounts 60, 62, 64. It will be noted that the pair of upper frame wall apertures 70, 72 corresponds to the upper isolation mounts 60, 62, while the single lower frame wall aperture 74 corresponds to the single lower isolation mount 64. It will also be noted in FIG. 4 that the frame wall aperture 74 and the lower isolation mount 64 are only partially shown in a cutaway view. To the extent that all three isolation mounts 60, 62, 64 are identical, as well as are their corresponding apertures 70, 72, 74, only the bottom isolation mount and its associated structure will be described and detailed hereinbelow.

Thus referring now to the bottom isolation mount 64, a wall bracket 80 may be welded at its bottom portion to the frame wall 12 within the aperture 74. Each bracket 80 may be supported by a pair of gussets 82 (only one shown in the cutaway view) that may be a) welded to the bracket 80, and b) welded to the exterior side of the frame wall 12, to provide a support for the bracket in two distinct planes on the frame wall 12, as shown.

The isolation mount 64 may include a lower load plate 86 and an upper load plate 90, both cooperating with the wall bracket 80. In the disclosed embodiment, the lower load plate 86 may be supported by an upper surface 84 of the bracket 80, as shown. Thus, a pair of upper and lower doughnut-shaped elastomer spacers 102 and 108 (variously called soft mount supports) may be situated between the lower load plate 86 and the load plate 90. As such, the spacers may be adapted to both retain cushion the support flange 68, and hence the mounting plate 40 along with its associated component 30, from vibration and other force loads. Generally, it will be appreciated by those skilled in the art that the elastomer spacers 102, 108 are adapted to maintain separation of the support flange 68 from any direct contact with either the bracket 80 or the load plate 90 (variously called hard mount supports).

The upper portion elastomeric spacer 102 interactively engages the lower spacer 108. For this purpose, the lower spacer 108 contains a vertical spindle or sleeved center portion 110; the upper spacer 102 includes a central concave conical lower seating surface that cooperates with a mating convex upper conical surface of the center portion 110, as shown. Interaction of the two conical mating surfaces is effective to optimize radial retention of the spacers 102, 108 under load.

Finally, a threaded bolt 120 extends through a load plate washer 92, positioned atop the load plate 90, for resilient vertical securement of the support flange 68 between the wall bracket 80, the elastomer spacers 102, 108 and the load plate 90, via threaded aperture 122 in the bracket 80, as depicted.

Although the foregoing description addresses only one contemplated embodiment, numerous other variations may fall within the spirit and scope thereof. By way of example, although the isolation mount structure has been described and detailed in connection with only three isolation mounts, any number of such mounts may be utilized, depending upon the particular structure and application involved. Thus, in some instances, either more than three or less than three mounts may be appropriate. Moreover, although described as a pair of upper isolation mounts and a single lower isolation mount, i.e. defining a symmetrical triangular arrangement on the exterior frame wall, alternate configurations may actually be asymmetric, and if more isolation mounts are utilized, may be shaped as a trapezoid or other non-triangular arrangement.

Those skilled in the art will appreciate that still other variations may fall within the scope of this disclosure, including, for example, isolation mounts that have physical connections to the mounting plate 40 that may lie outside of a single plane. Even though the strictly in-plane connection approach described herein may be considered ideal, it is not necessarily the only viable configuration possible. Moreover, even though all of the isolation mounts 60, 62, 64 are herein described and shown to be identical, a design utilizing a combination of non identical isolation mounts may be viable. Finally, although pairs of gussets 82 are shown welded to the bracket 80, the bracket support requirements may not necessarily require the use of dual gussets. As such, a simpler, smaller, single gusset configuration may be utilized that may take on alternative forms and shapes.

Thus, the scope of the present disclosure should not be limited to only the embodiments described in detail, as the breadth and scope of the disclosure is contemplated to be broader than any of the detailed embodiments herein presented.

INDUSTRIAL APPLICABILITY

The described load isolation mounting apparatus may be useful in a variety of machines, including wheel loaders, excavators, tractors, trucks, and other off-road machines. As disclosed, the load isolation mounting apparatus may be affixed to an exterior machine wall for protecting an interiorly positioned machine component from potentially harmful forces, including vibrations.

In operation, the mounting apparatus may be adapted to protect components having internal moving parts, such as the spool valve assembly 30, whenever linear, torsional, or other transient force loads may otherwise be transferred from the machine frame wall 12 to the component.

The mounting apparatus may afford additional benefits as well. For example, it is well known that isolation mounts may require significant space within the interior of machine frames. Placement of isolation mounts outside of the machine frame as disclosed may offer significantly greater flexibility with respect to design configurations of components, mounting plates, and associated isolation mounts.

Moreover, although horizontally configured isolation mounts are often utilized, it is known that vertically oriented isolation mounts, as mounts 60, 62, 64, provided with generally horizontal wall brackets 80, may offer enhanced reliability. Finally, in the vertically oriented isolation mount apparatus, as disclosed, the elastomer spacers 102, 108 may be adapted to not only resiliently support the weights of the mounting plate 40 and component 30, along with the weight of the support flanges 68, but the spacers may also provide double duty by cushioning vibration and other transient force loads imparted to the mounting plate via the frame wall 12.

What is claimed is:

1. A mounting apparatus adapted to secure a machine component closely adjacent one side of a frame wall, the frame wall including an aperture; the mounting apparatus comprising:
   a mounting plate having a generally planar body adapted for retention of the component;
   a support flange affixed to the mounting plate and adapted to extend generally orthogonally from the planar body of the mounting plate, and to pass through the aperture from one side of the frame wall to the other; and
   an isolation mount affixed to a side of the frame wall opposite that of the mounting plate, the isolation mount adapted to resiliently secure the support flange so as to cushion the mounting plate from vibrations and other impact loads that might otherwise be imparted by the frame wall, the isolation mount including a wall bracket adapted to be coupled to an edge of the frame wall aperture, and a gusset adapted to be coupled to the bottom of the bracket and to the side of the frame wall opposite the mounting plate for supporting the bracket in at least two planes on the frame wall.

2. The mounting apparatus of claim 1, wherein the mounting plate is on a side of the frame wall that is interior to the machine, and the isolation mount is affixed exterior to the frame wall.

3. The mounting apparatus of claim 2, wherein the machine component is a hydraulic spool valve, and the mounting plate is oriented vertically within the machine interior.

4. The mounting apparatus of claim 1, comprising three support flanges, each support flange extending from the planar body of the mounting plate, three apertures in the frame wall, and three isolation mounts affixed to said side of the frame wall opposite the mounting plate, wherein each of the three support flanges is adapted to pass through one of the apertures.

5. The mounting apparatus of claim 4, further comprising a pair of upper isolation mounts and a single lower isolation mount, each of the isolation mounts secured to the frame wall to define a symmetrical triangle arrangement on an exterior side of the frame wall.

6. The mounting apparatus of claim 5, wherein each support flange is adapted to be affixed by welded connection to the planar body of the mounting plate.

7. The mounting apparatus of claim 1 wherein the wall bracket is substantially horizontally oriented.

8. The mounting apparatus of claim 1, wherein the isolation mount further comprises a pair of elastomer spacers adapted to resiliently support the mounting plate, the component, and the support flange, the spacers also adapted to cushion vibration and other transient force loads imparted to the mounting plate from the frame wall.

9. The mounting apparatus of claim 8, wherein the elastomer spacers comprise a pair of conical mating surfaces adapted to optimize radial retention under load.

10. The mounting apparatus of claim 1, wherein the machine component is a spool valve assembly.

11. A machine having a machine component to be mounted thereon, the machine comprising:
    a frame wall subject to vibration, the frame wall having an exterior side facing an exterior space, an opposed interior side facing an interior space, and at least one aperture;
    a mounting plate positioned within the interior space and adapted to fixedly contain the machine component;
    a support flange affixed to the mounting plate and extending through the aperture from the interior space to the exterior space;
    an isolation mount having a bracket affixed to the exterior side and a resilient spacer positioned in the exterior space, and affixed to the support flange extending through the aperture, whereby the machine component may be positioned within the interior space closely adjacent the interior side while being vibrationally isolated therefrom.

12. The machine of claim 11, wherein the machine component is a hydraulic spool valve, and the mounting plate is oriented vertically within the interior space.

13. The machine of claim 11, comprising three support flanges, each support flange extending from the mounting plate, three apertures in the frame wall, and three isolation mounts affixed to the exterior side of the frame wall, wherein each of the three support flanges is adapted to pass through an associated one of the apertures.

14. The machine of claim 13, further comprising a pair of upper isolation mounts and a single lower isolation mount, each of the isolation mounts secured to the frame wall to define a symmetrical triangle arrangement on the frame wall exterior side.

15. The machine of claim 14, wherein each support flange is adapted to be affixed by welded connection to the mounting plate.

16. The machine of claim 11, wherein the isolation mount comprises a wall bracket adapted to be welded to an edge of the aperture in the frame wall, and a gusset adapted to be welded to the bottom of the bracket and to the exterior side of the frame wall for supporting the bracket in at least two planes on the frame wall.

17. The machine of claim 16 wherein the wall bracket is substantially horizontally oriented.

18. The machine of claim 11, wherein the isolation mount further comprises a pair of elastomer spacers adapted to resiliently support the weight of the mounting plate, the component, and the support flange, the spacers also adapted to cushion vibration and other transient force loads imparted to the mounting plate from the frame wall.

19. The machine of claim 18, wherein the elastomer spacers comprise a pair of conical mating surfaces adapted to optimize radial retention under load.

* * * * *

UNITED STATES PATENT AND TRADEMARK OFFICE
CERTIFICATE OF CORRECTION

| | | Page 1 of 1 |
|---|---|---|
| PATENT NO. | : 8,919,725 B2 | |
| APPLICATION NO. | : 13/478598 | |
| DATED | : December 30, 2014 | |
| INVENTOR(S) | : Sayre et al. | |

It is certified that error appears in the above-identified patent and that said Letters Patent is hereby corrected as shown below:

IN THE SPECIFICATION

Column 4, line 57, delete "non identical" and insert -- non-identical --.

Signed and Sealed this
Twenty-fourth Day of November, 2015

Michelle K. Lee
*Director of the United States Patent and Trademark Office*